United States Patent
La Vecchia et al.

(10) Patent No.: US 8,099,311 B2
(45) Date of Patent: Jan. 17, 2012

(54) SYSTEM AND METHOD FOR ROUTING TASKS TO A USER IN A WORKFORCE

(75) Inventors: Gioacchino La Vecchia, Castrofilippo (IT); Alberto Colombo, Forli (IT); Massimo Piccioni, Forli (IT)

(73) Assignee: CrowdEngineering, Inc., Boston, MA (US)

( * ) Notice: Subject to any disclaimer, the term of this patent is extended or adjusted under 35 U.S.C. 154(b) by 895 days.

(21) Appl. No.: 12/072,382

(22) Filed: Feb. 25, 2008

(65) Prior Publication Data
US 2008/0209431 A1   Aug. 28, 2008

Related U.S. Application Data

(60) Provisional application No. 60/903,032, filed on Feb. 23, 2007.

(51) Int. Cl.
*G06Q 10/00* (2006.01)
(52) U.S. Cl. ...................................................... 705/7.14
(58) Field of Classification Search .................. None
See application file for complete search history.

(56) References Cited

U.S. PATENT DOCUMENTS

| | | | | |
|---|---|---|---|---|
| 5,164,897 | A * | 11/1992 | Clark et al. | 705/321 |
| 5,416,694 | A * | 5/1995 | Parrish et al. | 705/8 |
| 5,974,392 | A * | 10/1999 | Endo | 705/8 |
| 6,049,776 | A * | 4/2000 | Donnelly et al. | 705/8 |
| 6,272,467 | B1 * | 8/2001 | Durand et al. | 705/26.1 |
| 6,275,812 | B1 * | 8/2001 | Haq et al. | 705/11 |
| 6,289,340 | B1 * | 9/2001 | Puram et al. | 705/7 |
| 6,578,005 | B1 * | 6/2003 | Lesaint et al. | 705/7.14 |
| 6,662,194 | B1 * | 12/2003 | Joao | 705/1.1 |
| 6,735,570 | B1 * | 5/2004 | Lacy et al. | 705/7 |
| 6,823,315 | B1 * | 11/2004 | Bucci et al. | 705/9 |
| 7,149,703 | B2 * | 12/2006 | Younger | 705/9 |
| 7,167,855 | B1 * | 1/2007 | Koenig | 707/999.003 |
| 7,191,138 | B1 * | 3/2007 | Roy et al. | 705/7 |
| 7,191,139 | B2 * | 3/2007 | Roy et al. | 705/7 |
| 7,212,985 | B2 * | 5/2007 | Sciuk | 705/8 |
| 7,437,309 | B2 * | 10/2008 | Magrino et al. | 705/11 |

(Continued)

FOREIGN PATENT DOCUMENTS

JP    05225203 A  *  9/1993

(Continued)

OTHER PUBLICATIONS

Hollingsworth, David; Workflow Management Coalition, "The Workflow Reference Model," Jan. 19, 1995; p. 13.*

(Continued)

*Primary Examiner* — Beth V Boswell
*Assistant Examiner* — Ivan R Goldberg
(74) *Attorney, Agent, or Firm* — Gard & Kaslow LLP (57) ABSTRACT

A routing system and method efficiently routes tasks to users who are members of a large and geographically diverse workforce. Generally, limited information is known about each user's skills and behavioral factors. Based on a profile containing the known information about a user, task is efficiently allocated and routed to a user by matching attributes of the task to the profile using a neural network and a stochastic model. Feedback is collected by the routing system based on the user's handling of the task and on whether a solution provided by the user was accepted. Over time, as more feedback is collected, the profile and/or the neural network are refined which allows for more efficient routing of future tasks.

18 Claims, 12 Drawing Sheets

U.S. PATENT DOCUMENTS

| | | | |
|---|---|---|---|
| 7,502,748 B1 * | 3/2009 | Baldwin et al. | 705/9 |
| 7,593,860 B2 * | 9/2009 | Mitchell | 705/8 |
| 7,660,723 B2 * | 2/2010 | Cirulli et al. | 705/1.1 |
| 7,698,235 B2 * | 4/2010 | Kuroiwa | 706/12 |
| 7,720,791 B2 * | 5/2010 | Hyder et al. | 705/9 |
| 7,805,382 B2 * | 9/2010 | Rosen et al. | 705/321 |
| 7,881,957 B1 * | 2/2011 | Cohen et al. | 1/1 |
| 7,885,844 B1 * | 2/2011 | Cohen et al. | 1/1 |
| 2001/0042000 A1 * | 11/2001 | Defoor, Jr. | 705/9 |
| 2002/0002479 A1 * | 1/2002 | Almog et al. | 705/8 |
| 2002/0055870 A1 * | 5/2002 | Thomas | 705/10 |
| 2003/0033185 A1 * | 2/2003 | Leto et al. | 705/8 |
| 2003/0105657 A1 * | 6/2003 | Nandigama et al. | 705/9 |
| 2003/0191680 A1 * | 10/2003 | Dewar | 705/8 |
| 2004/0010480 A1 * | 1/2004 | Agnihotri et al. | 706/20 |
| 2005/0202380 A1 * | 9/2005 | Iwamoto | 434/238 |
| 2005/0246299 A1 * | 11/2005 | Scarborough et al. | 706/21 |
| 2005/0261953 A1 * | 11/2005 | Malek et al. | 705/10 |
| 2006/0106675 A1 * | 5/2006 | Cohen et al. | 705/26 |
| 2006/0106774 A1 * | 5/2006 | Cohen et al. | 707/3 |
| 2006/0229902 A1 * | 10/2006 | McGovern et al. | 705/1 |
| 2006/0271421 A1 * | 11/2006 | Steneker et al. | 705/9 |
| 2008/0082542 A1 * | 4/2008 | Cohen et al. | 707/10 |
| 2008/0208849 A1 * | 8/2008 | Conwell | 707/5 |
| 2008/0228549 A1 * | 9/2008 | Harrison | 705/9 |

FOREIGN PATENT DOCUMENTS

| | | | |
|---|---|---|---|
| JP | 07282144 A | * | 10/1995 |
| JP | 08110920 A | * | 4/1996 |
| JP | 09282359 A | * | 10/1997 |
| JP | 2001338097 | * | 12/2001 |
| JP | 2004118648 | * | 4/2004 |
| JP | 2005327028 | * | 11/2005 |
| JP | 2006244000 | * | 9/2006 |
| WO | WO03081871 A1 | | 10/2003 |

OTHER PUBLICATIONS

Jeff Howe, "The Rise of Crowdsourcing," Wired, Jun. 2006; http://www.wired.com/wired/archive/14.06/crowds.html.

Aspect Contact Servers (Aspect Product Overview), Aspect Software, 300 Apollo Drive, Chelmsford, MA 01824; www.aspect.com.

Workflow Reference Model Diagram; http://www.wfmc.org/standards/referencemodel.html.

iStockPhoto; http://www.istockphoto.com/index.php, 2008.

InnoCentive Open Innovation Marketplace; http://www.innocentive.com, 2007.

yourEncore; http://www.yourencore.com/, 2008.

Amazon Web Services: Amazon Mechanical Turk; http://www.amazon.com/Mechanical-Turk-AWS-home-page/b/ref, 2008.

Cambrian House, Home of Crowdsourcing; http://www.cambrianhouse.com/.

Elance—Outsourcing to freelance programmers, web & logo design; http://www.elance.com/p/landing/buyer.html, 2008.

Pipes: Rewire the Web; http://pipes.yahoo.com/pipes/, 2008.

Yahoo! Answers blog; http://answers.yahoo.com/, 2008.

Kluster—real-world group decision-making; http://kluster.com.

HumanGrid: Human-powered data services; HumanGrid GmbH; http://www.humangrid.eu/.

JeffPHowe; Crowdsourcing; Wired Magazine, May 27, 2008; http://crowdsourcing.typepad.com/.

Crowdsourcing—Wikipedia; http://en.wikipedia.org/wiki/Crowdsourcing.

Clickworkers; http://clickworkers.arc.nasa.gov/top.

Paul Boutin; Crowdsourcing: Consumers as Creators; Businessweek; Jul. 13, 2006; http://www.businessweek.com.

Don Tapscott and Anthony D. Williams; Innovation in the Age of Mass Collarboration; Businessweek, Feb. 1, 2007; http://www.businessweek.com.

* cited by examiner

| Skill | User A | User B | User C | User D |
|---|---|---|---|---|
| SMS | 100 | 40 | 20 | 5 |
| Mail | 100 | 40 | 20 | 5 |
| Phone | 100 | 40 | 20 | 5 |
| Mobile TV | 20 | 100 | 5 | 5 |
| Mobile Phone | 20 | 100 | 5 | 5 |
| Terms | 5 | 5 | 50 | 100 |
| Invoice | 5 | 5 | 50 | 100 |

SYSTEM AND METHOD FOR ROUTING TASKS TO A USER IN A WORKFORCE

RELATED APPLICATIONS

This nonprovisional U.S. patent application claims the priority benefit of U.S. provisional patent application No. 60/903,032 filed Feb. 23, 2007 and entitled "System and Method to Enable, Support and Control Collaborative Activities of Sparse Workforces" which is incorporated by reference herein.

BACKGROUND

1. Field of the Invention

The present invention relates generally to management of a workforce and more specifically to allocating a task to a user in the workforce.

2. Description of the Related Art

Assigning tasks to members of a workforce is typically performed by randomly assigning members or by a manager who supervises a defined number of members. These methods become inefficient as the workforce expands or as information about members becomes outdated and/or sparse. Further, some workforces, such as those that exist through social networks on the Internet, may be unable to collect reliable data about an incoming member. Therefore, there is a need for allocating tasks to members of large workforces where a limited amount of information about each member is known.

SUMMARY

A system and method for allocating a task to one of a plurality of users is provided. A task includes a set of task attributes which characterize the task. The allocation of the task is performed using a neural network based on skill metrics associated with each user of the plurality of users and performance indicators associated with past behaviors of each user of the plurality of users. The task is then routed to the user and feedback is collected from whomever submitted the task and feedback is also collected based on the user's behavior.

According to various embodiments, a method for allocating a task to a user is provided. A task including at least one normalized task attribute is received. A plurality of profiles is accessed, and each profile is associated with a user and including a plurality of skill metrics and a plurality of performance indicators of the user. An initial value for each profile is calculated based on the at least one normalized task attribute and the plurality of skill metrics. A fitness metric for each profile is calculated based on the initial value using a neural network having weights based on the plurality of performance indicators. A profile is selected based on a stochastic model using the fitness metric. The task is routed to the user associated with the selected profile.

According to various embodiments, a system for allocating tasks is provided. In the system, an input module is configured to receive a task including at least one normalized task attribute. A profile module is configured to access a plurality of profiles, and each profile is associated with a user and including a plurality of skill metrics and a plurality of performance indicators of the user. A supervised learning module is configured to calculate an initial value for each profile based on the at least one normalized task attribute and the plurality of skill metrics. An unsupervised learning module is configured to calculate a fitness metric for each individual profile based on the initial value using a neural network having weights based on the plurality of performance indicators. A stochastic module is configured to select a profile based on a stochastic model using the fitness metric. An output module is configured to route the task to the user associated with the selected profile.

According to various embodiments, a computer readable medium having embodied thereon a program executable by a processor for executing a method for allocating a task is provided. A task including at least one normalized task attribute is received. A plurality of profiles is accessed, and each profile is associated with a user and including a plurality of skill metrics and a plurality of performance indicators of the user. An initial value for each profile is calculated based on the at least one normalized task attribute and the plurality of skill metrics. A fitness metric for each profile is calculated based on the initial value using a neural network having weights based on the plurality of performance indicators. A profile is selected based on a stochastic model using the fitness metric. The task is routed to the user associated with the selected profile.

DETAILED DESCRIPTION

In workforces that include a large number of users who may perform tasks, tasks are allocated to the users or a group of the users. A task may include, for example, a problem to be solved, a question to be answered, a survey or questionnaire, a request for proposals, or the like. To allocate tasks to users in a workforce, a task including normalized task attributes is received by a routing system. The normalized task attributes correspond to skill metrics within a profile of each user. A supervised learning portion of a neural network calculates an initial value based on the skill metrics of each user and the normalized task attributes. The initial value associated with each profile is input into an unsupervised learning portion of the neural network having weights. In the unsupervised learning portion, the weights are based on measures of behavior of a user, expressed quantitatively by performance indicators within the profile of each user. For each profile, a neural network is generated to calculate a fitness metric. To distribute tasks among the users, a stochastic model is used to select a profile based in part on the fitness metric. The task is then routed to the user associated with the selected profile and feedback is collected from the individual and the selected user.

Users may include traditional employees, contractors, outsourcing companies, members of social networks, and the like. In these workforces, a limited amount of information may be known about actual skills, demographics, or behaviors of each user. In some embodiments, users also include non-human systems. For example, a task may be allocated to a non-human system such as a website, an external system, an interactive voice responder, or other automated system.

Figure 1:
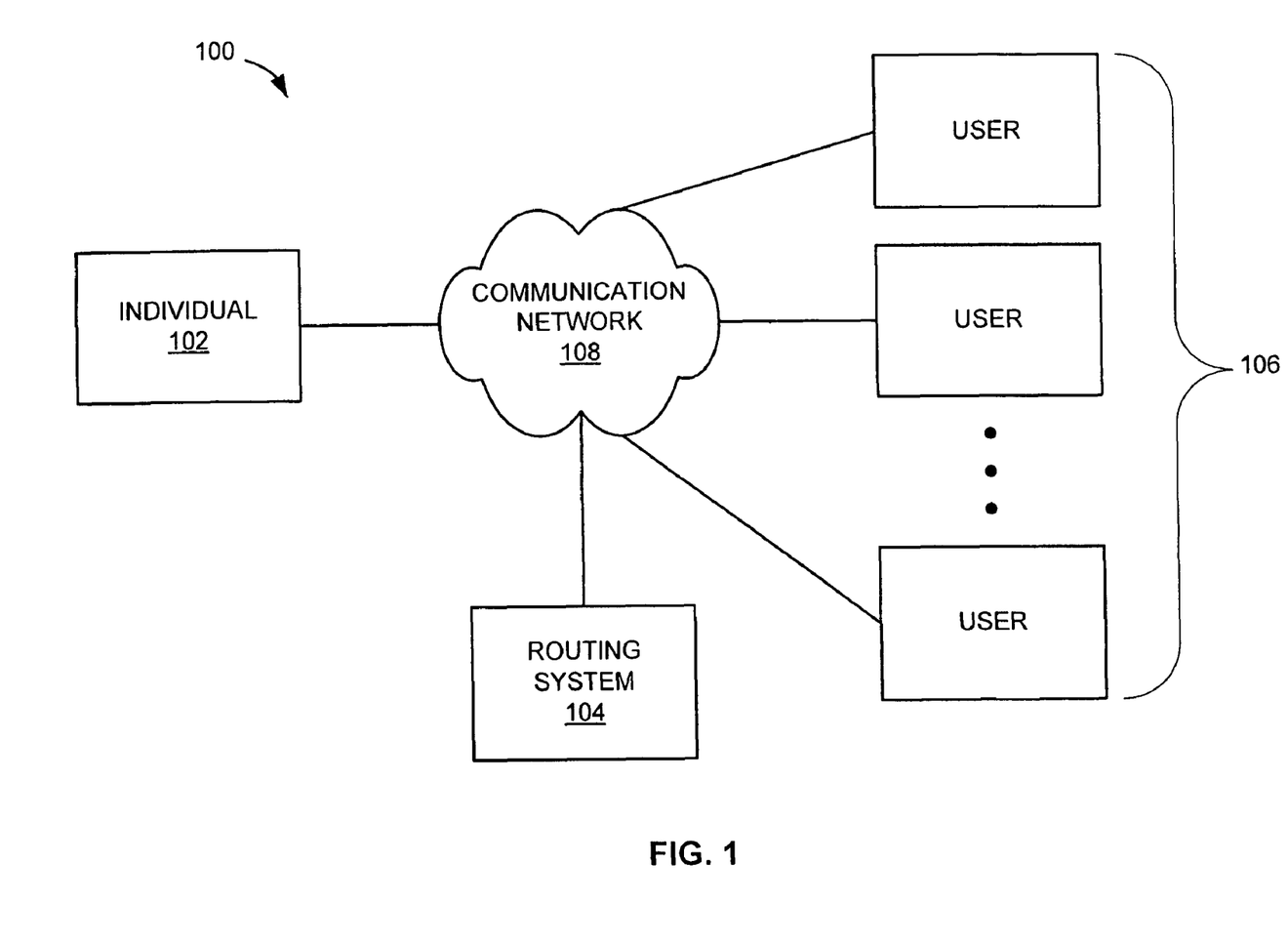
FIG. 1 is a diagram of a computing network including a routing system for allocating a task to a user according to various embodiments.

FIG. 1 is a diagram of a computing network 100 including a routing system for allocating a task to a user according to various embodiments. The environment 100 includes an individual 102, a routing system 104 and a plurality of users 106. The individual 102, the routing system 104, and the plurality of users 106 are configured to communicate via a communication network 108.

The individual 102 submits a task to the routing system 104 via the communication network 108 using a computing device, a telephone, a mobile phone, a personal digital assistant, or the like. The individual 102 is anyone who submits a task to the routing system 104 and may be, for example, a person, someone acting on behalf of an entity, or a group of people.

As depicted, the routing system 104 is configured to receive the task from the individual 102. The task includes at least one task attribute that quantitatively describes an identified skill or skill set that is required to complete the task and is associated with a value indicating the relative importance of the skill.

The routing system 104 may comprise one or more computing devices including computer readable media, a processor, and/or logic. For example, the routing system 104 may comprise a processor configured to execute computing instructions stored in the computer readable medium. These instructions may be embodied in software. In some embodiments, the computer readable medium comprises an IC memory chip, such as, for example, static random access memory (SRAM), dynamic random access memory (DRAM), synchronous DRAM (SDRAM), non-volatile random access memory (NVRAM), and read only memory (ROM), such as erasable programmable ROM (EPROM), electrically erasable programmable ROM (EEPROM), and flash memory. Alternatively, the routing system 104 may comprise one or more chips with logic circuitry, such as, for example, an application specific integrated circuit (ASIC), a processor, a microprocessor, a microcontroller, a field programmable gate array (FPGA), a programmable logic device (PLD), a complex programmable logic device (CPLD), or other logic device.

The routing system 104 is configured to receive the task. Upon receiving the task, the routing system 104 is configured to access a plurality of profiles of users 106 and determine to which user of the plurality of users 106 to allocate the task.

Each user of the users 106 is associated with a profile. A user is a person who may be able to provide a solution to a task. The profile may include information about the user's skills, the user's behavior in response to previous tasks, and/or demographic information. The profiles are discussed further in connection with FIG. 2.

Upon allocating the task to a user, the routing system 104 routes a message describing the task to the user via the communication network 108 using a computing device, a telephone, a mobile phone, a personal digital assistant, or the like. The user may in turn provide a solution to the task. Feedback is collected by the routing system 104 based at least on whether the user provided a solution to the task or if the individual accepted the solution to the task.

The communications network 108 includes, but is not limited to, a local area network (LAN), a wide area network (WAN), the Internet, a telephone network, or the like.

Figure 2:
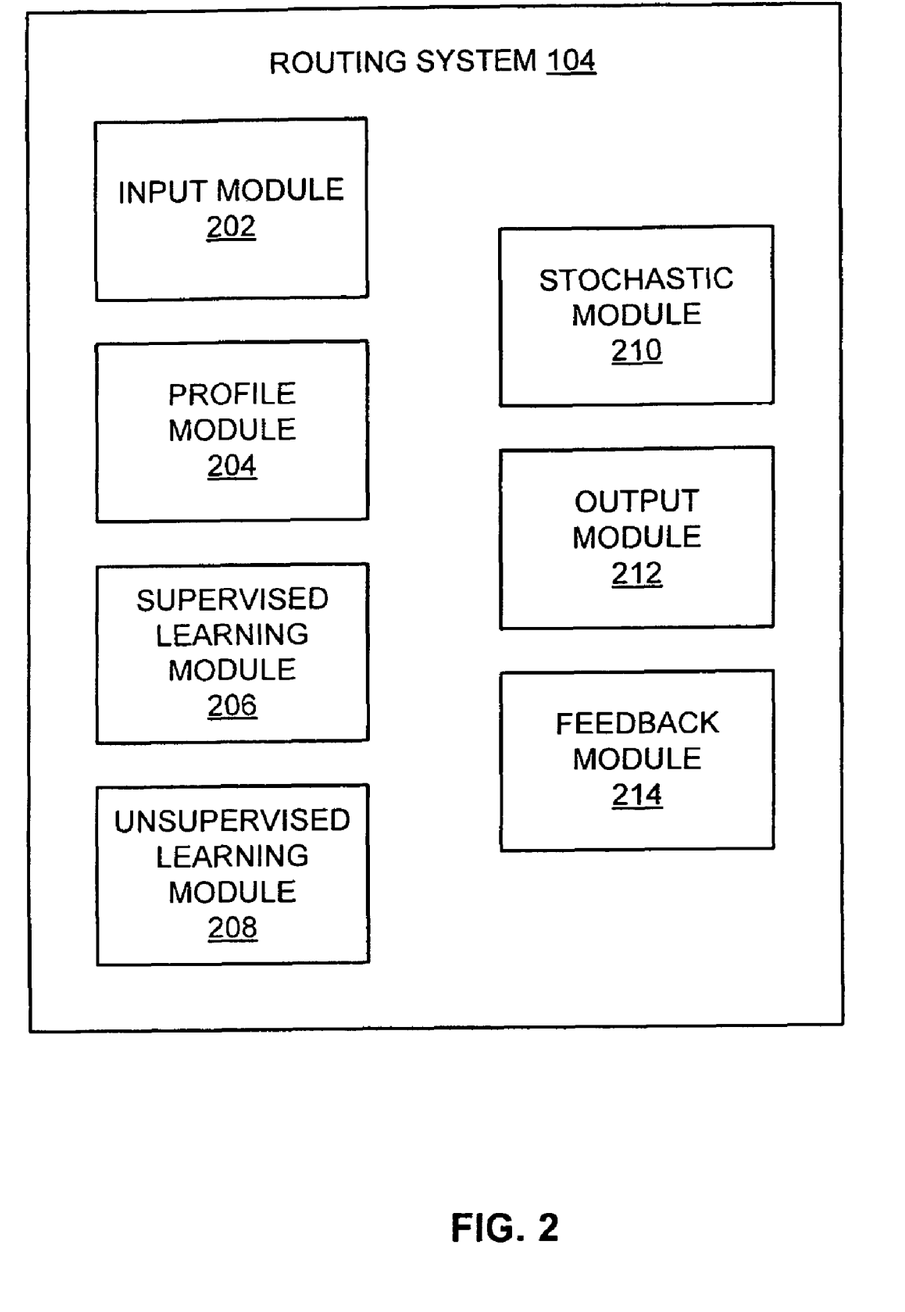
FIG. 2 is a block diagram of the routing system for allocating a task to a user according to various embodiments.

FIG. 2 is a block diagram of the routing system 104 for allocating a task to a user according to various embodiments. The routing system 104 includes an input module 202, a profile module 204, a supervised learning module 206, an unsupervised learning module 208, a stochastic module 210, an output module 212, and a feedback module 214. The modules may be implemented in the routing system 104 as software and/or hardware.

The input module 202 is configured to receive a task including a set of normalized task attributes. Each task attribute includes an identifier of a particular skill and a normalized quantifier indicating the importance of the skill for providing a solution to the task.

Figure 3A:
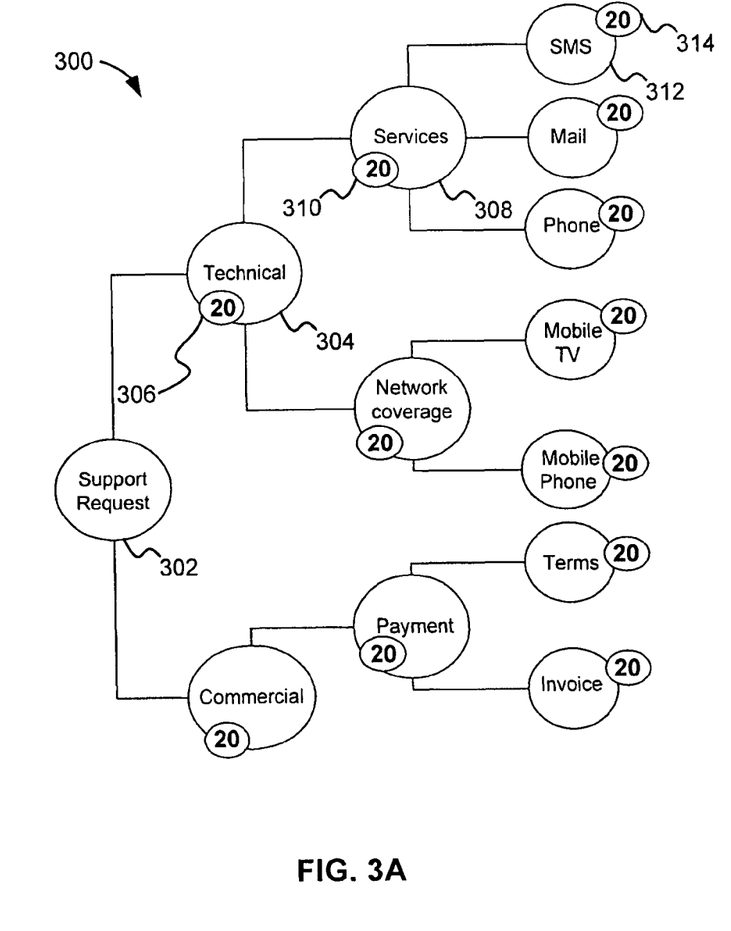
FIG. 3A is an exemplary task attribute tree according to various embodiments.

Referring now to FIG. 3A, an exemplary task attribute tree 300 according to various embodiments is depicted. The task attribute tree 300 is an organization of the task attributes and corresponds to the various skills of the users, for example, users 106. In this instance, the task is a support request 302 for a mobile communications provider. The individual, e.g., individual 102, initiating the task may identify the task as a technical task 304. The technical task 304 is assigned an intermediate value 306 of twenty. If the individual can not further define the task, the intermediate value is assigned to all the leaves depending from the technical task 304. Otherwise, the individual may specify that the technical task 304 is a services task 308 having an intermediate value 310 of twenty. In this example, the task is further identified as an SMS task 312. Within the task attribute tree 300, the SMS task is associated with a skill value 314 of twenty. The skill value 314 may be based on a template used to define the task, be specified by the individual, or be based on a questionnaire answered by the user, for example.

As is apparent to those skilled in the art, the intermediate values 306 and 310 may have a value other than twenty. Further, the skill value 314 may be a different value. Further, the task attribute tree 300 is shown for the purposes of illustration only. As will be apparent to those skilled in the art, other data structures can be used to assign task attributes. The task attribute values, once determined, are normalized according to known normalization techniques.

Referring back to FIG. 2, the profile module 204 is configured to access profiles of users. For each user, a profile includes a plurality of skill metrics and a plurality of performance indicators. In some embodiments, the profile also includes demographic information about the user such as age, gender, location, political affiliation, or the like. The skill metrics correspond to the particular skills defined by the task attributes and indicate the user's skill level for each particular skill. The skill metrics are determined based on formal training of the user such as certifications, training sessions, seminars, coursework, and the like. The data in the profile may be imported from another system or platform. In some embodiments, the skill metrics are also based on whether a previous solution provided by the user that required the skill was accepted.

Figure 3B:
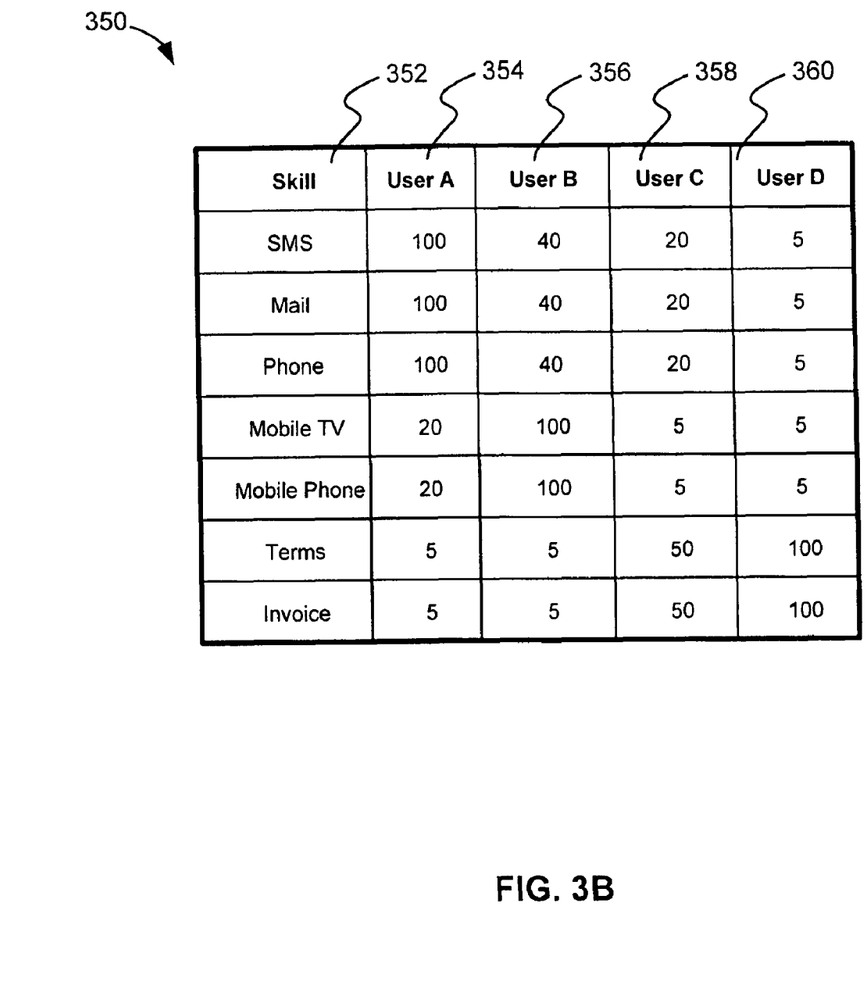
FIG. 3B is a table depicting the skill attributes of various users according to various embodiments.

Referring now to FIG. 3B, a table 350 depicting the skill metrics of users according to various embodiments is shown. The table 350 includes skills 352 which correspond to the task attributes of the task attribute tree 300. For the purposes of illustration, the table 350 includes the skill metrics for each task attribute of User A 354, User B 356, User C 358, and User D 360.

The performance indicators within the profile module 204 include behavioral factors of a user. Typically, the performance indicators are cumulatively calculated as a user is allocated tasks and provides solutions to those tasks. To illustrate, one performance indicator is "reliability" which is measured by dividing the number of tasks that the user has solved by the number of tasks that the user has been allocated. Another example is "commitment" which is measured by dividing the number of tasks that the user has accepted from the routing system 104 by the number of tasks that the user has been allocated. Further performance indicators may be measured based on, for example, an amount of time to accept an allocated task or an amount of time to provide a solution to the allocated task.

Referring back to FIG. 2, the supervised learning module 206 is configured to calculate at least one initial value for each profile based on the at least one normalized task attribute and the plurality of skill metrics. For each task attribute associated with the task, an initial value is generated based on the value of a corresponding skill metric within the profile of the user. The initial value may be zero for a task attribute if the user has a skill metric having a zero value or if the individual indicated that task attribute was not is not relevant to the current task.

The unsupervised learning module 208 is configured to calculate a fitness metric for each profile based on the initial values. The unsupervised learning module 208 uses a neural network for each profile. The initial values for each profile are input into the unsupervised learning module 208. The unsupervised learning module 208 uses a neural network that includes weighting factors that are based on the plurality of performance indicators within the profile. Neural networks are generally known to those skilled in the art.

Figure 4:
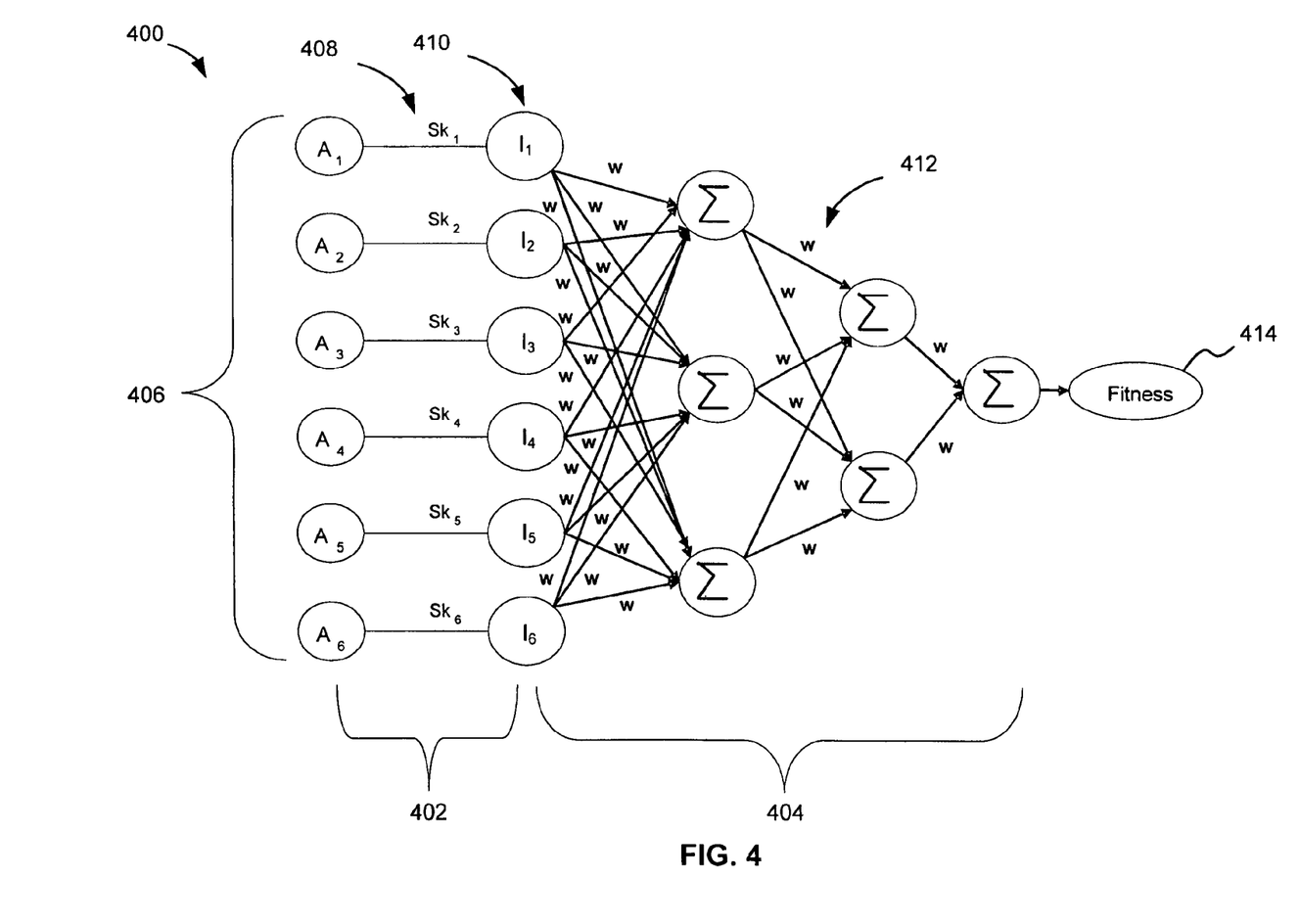
FIG. 4 is a diagram of an exemplary neural network according to various embodiments.

Referring now to FIG. 4, a diagram of an exemplary neural network 400 according to various embodiments is shown. The neural network 400 includes a supervised learning portion 402 and an unsupervised learning portion 404.

The supervised learning portion 402 includes normalized task attributes $A_N$ 406 and skill metrics $Sk_N$ 408 both as described in connection with FIG. 3A. The supervised learning portion 402 calculates initial values 410 according to the formula:

$$I_N = A_N * Sk_N$$

While the calculation of the initial values is shown as part of the neural network, it will be apparent that other techniques may be used. The supervised learning portion 402 is implemented by the supervised learning module 206.

The unsupervised learning portion 404, implemented by the unsupervised learning module 208, includes a neural network having weights $w_m$ 412 between nodes. The unsupervised learning portion 404 receives the initial values 410 and calculates a fitness metric 414. The value at each secondary node of the unsupervised learning portion 404 is:

$$\Sigma = \Sigma (I_N * w_m)$$

As is apparent to those skilled in neural networks, at each successive node, the value is calculated in similar fashion. It should be noted that each weight 412 may be different from the other weights. From the unsupervised learning portion 404, the fitness metric 414 associated with the profile on which the neural network is based is output.

Figure 5A:
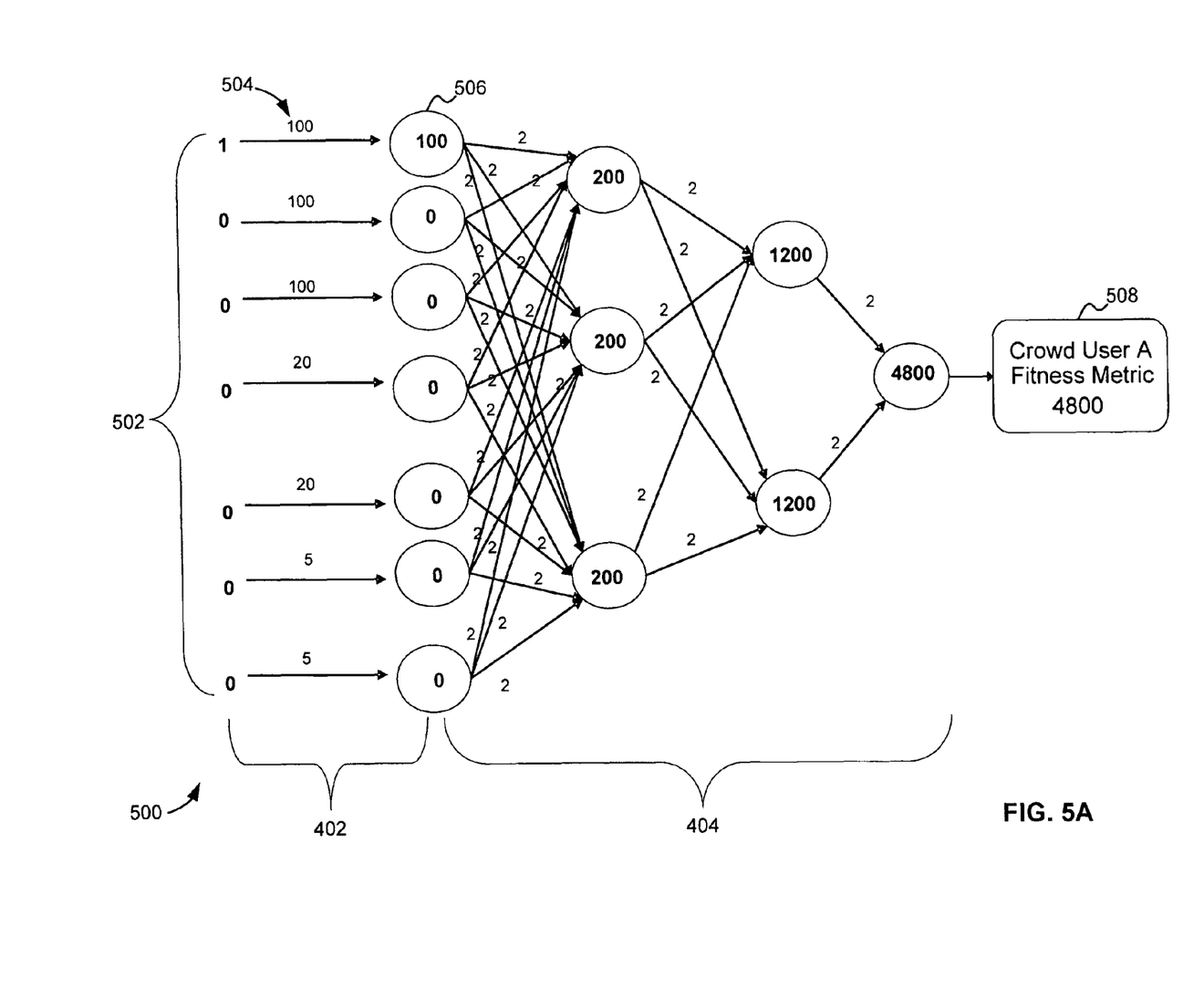
FIG. 5A is a depiction of a neural network associated with a first user according to various embodiments.

Returning to the SMS task 312 example, FIG. 5A depicts a neural network 500 associated with the User A 354 of FIG. 3B according to various embodiments. In the neural network 500, the normalized task attributes 502 for the SMS task as described in connection with FIG. 3A are input into the supervised learning portion 402. The skill metrics 504 of User A 354 as described in connection with FIG. 3B are also included in the supervised learning portion of the neural network 500. The initial values 506 are calculated as discussed in connection with FIG. 4. Based on the initial values, an unsupervised learning portion 404 of the neural network 500 calculates a fitness metric 508 of 4800 for the User A 354. The weights in the neural network 500 are all depicted as the value two; however, as will be apparent to one skilled in the art, the weights may vary.

Figure 5B:
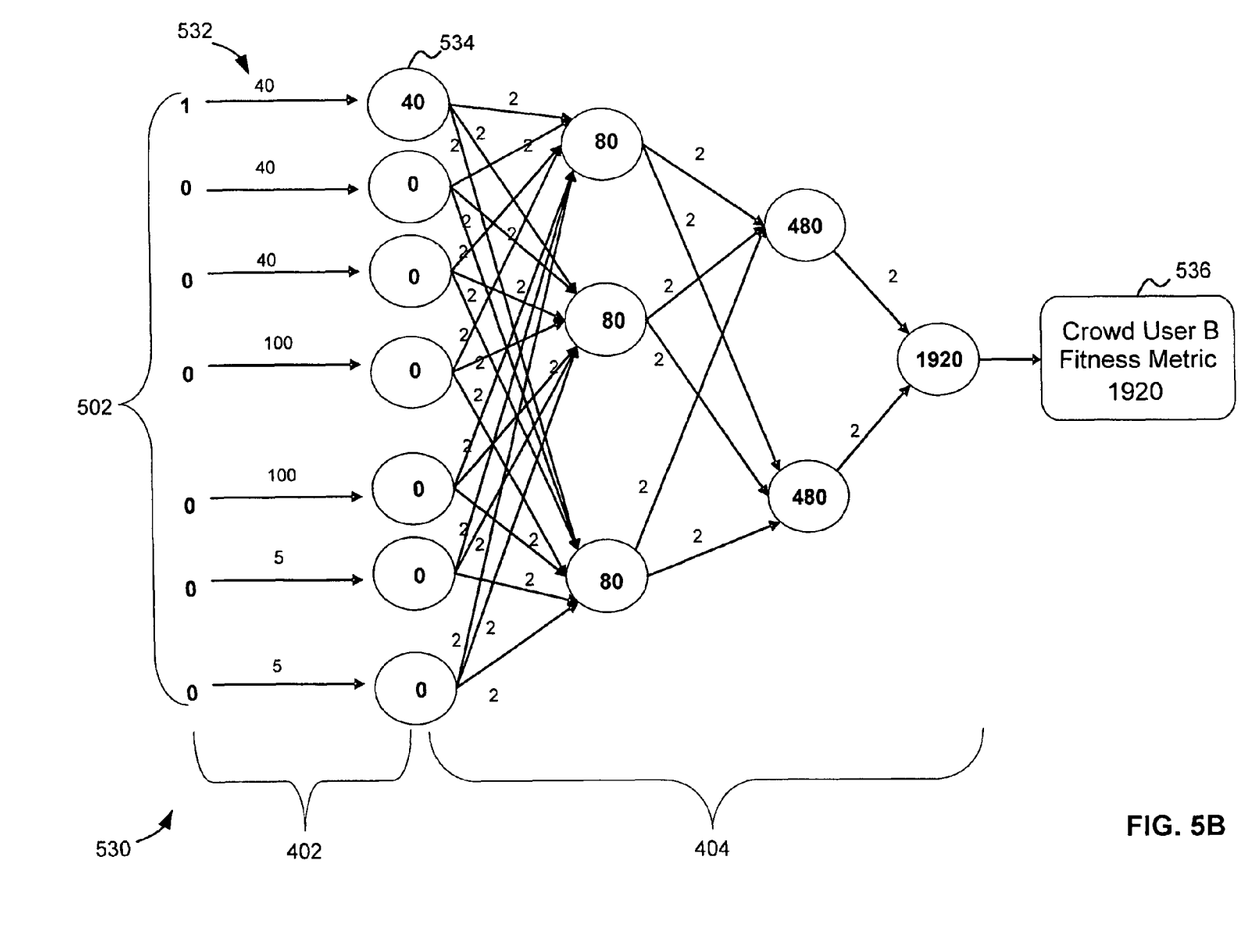
FIG. 5B is a depiction of a neural network associated with a second user according to various embodiments.

FIG. 5B is a depiction of a neural network 530 associated with the User B 356 of FIG. 3B according to various embodiments. The neural network 530 receives the same task attributes 502 as the neural network 500. The supervised learning portion 402 of the neural network 530, however, includes the skill metrics 532 of User B 356. Based on the initial values 534 calculated by the neural network 530, the unsupervised learning portion 404 of the neural network 530 calculates a fitness metric 536 of 1920 for the User B 356.

Figure 5C:
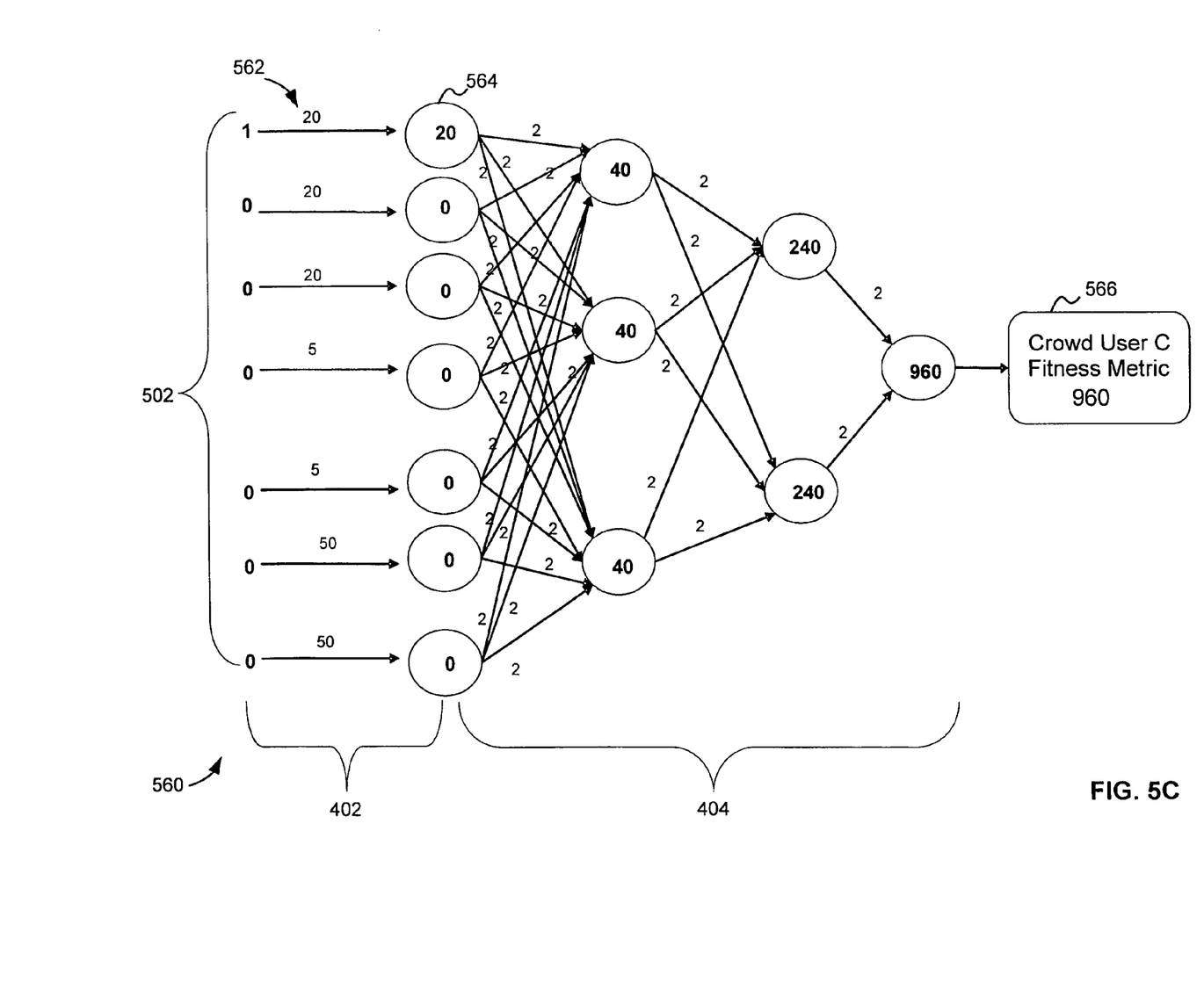
FIG. 5C is a depiction of a neural network associated with a third user according to various embodiments.

FIG. 5C is a depiction of a neural network 560 associated with the User C 358 of FIG. 3B according to various embodiments. The neural network 560 receives the same task attributes 502 as the neural network 500. The supervised learning portion 402 of the neural network 560, however, includes the skill metrics 562 of User C 358. Based on the initial values 564 calculated by the neural network 560, the unsupervised learning portion 404 of the neural network 560 calculates a fitness value 566 of 960 for the User C 358.

Figure 5D:
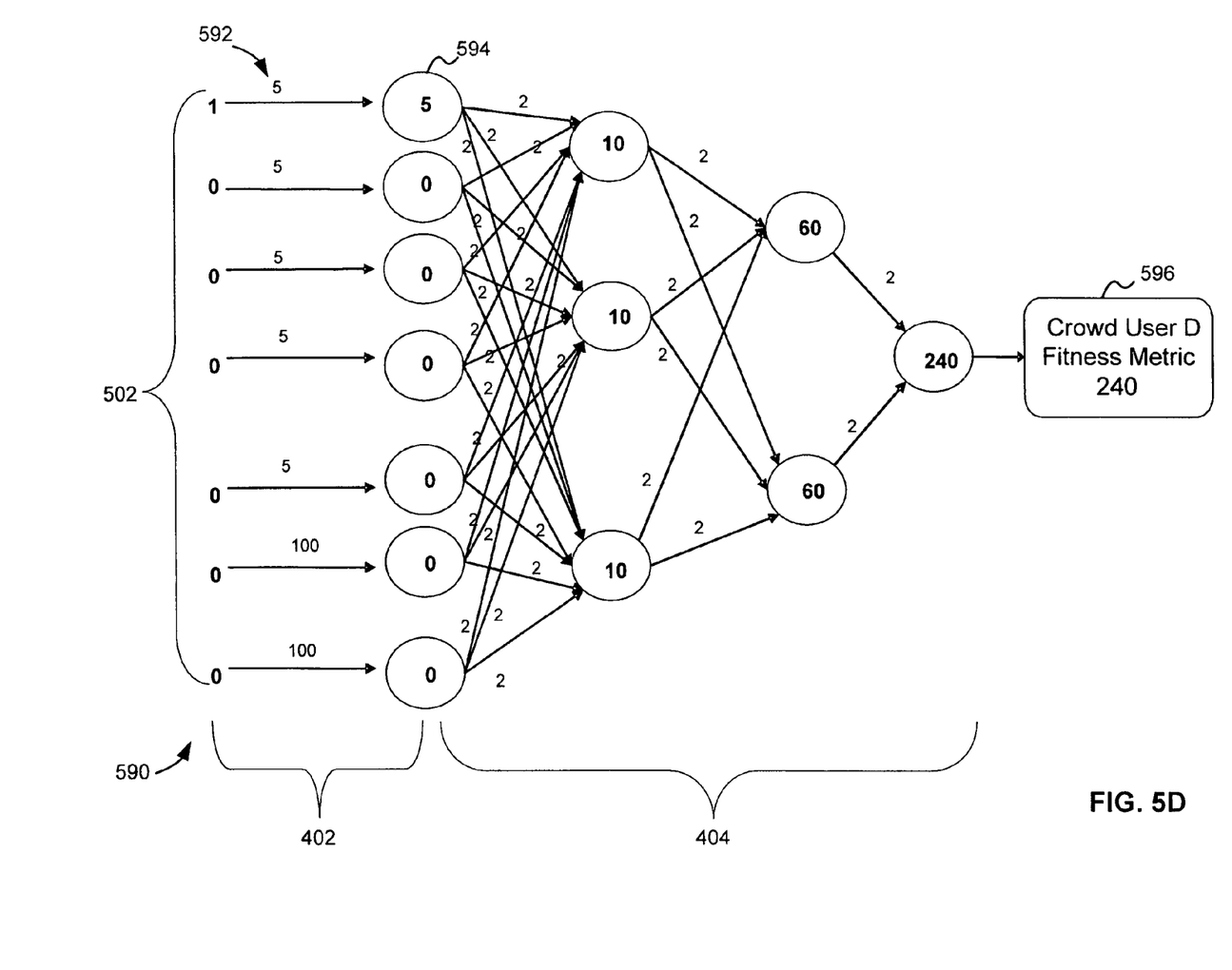
FIG. 5D is a depiction of a neural network associated with a fourth user according to various embodiments.

FIG. 5D is a depiction of a neural network 590 associated with the User D 360 of FIG. 3B according to various embodiments. The neural network 590 receives the same task attributes 502 as the neural network 500. The supervised learning portion 402 of the neural network 590, however, includes the skill metrics 592 of User D 360. Based on the initial values 594 calculated by the neural network 590, the unsupervised learning portion 404 of the neural network 590 calculates a fitness metric 596 of 240 for the User D 360.

Returning to FIG. 2, the stochastic module 210 receives the fitness metrics calculated by the unsupervised learning module 208. The stochastic module 210 is configured to select a profile by implementing a stochastic model using the fitness metric. Because neural networks are designed to select a single best pathway based on feedback, a neural network by itself consistently routes similar tasks to the same user. To avoid allocating too many tasks to a single user, the stochastic module 210 is included in the routing system 104. The stochastic module 210 randomly selects profiles associated with a fitness metric in order to distribute tasks among users who would not otherwise be selected because another user has a higher fitness metric for a specific task.

Figure 6:
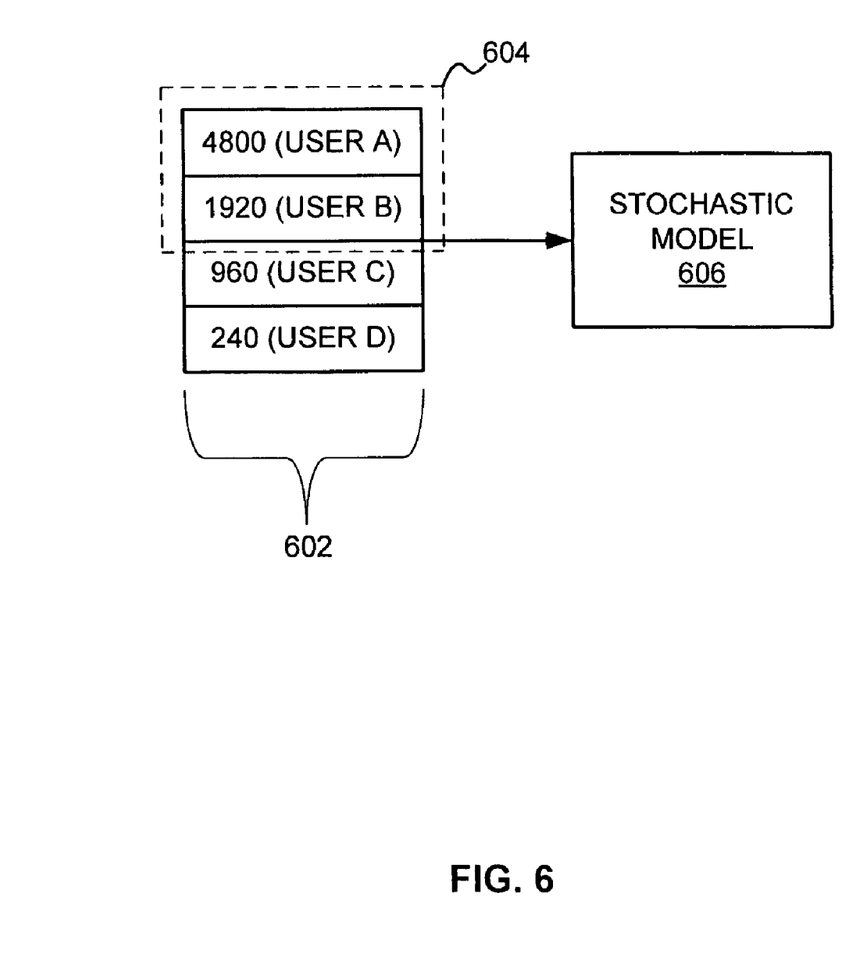
FIG. 6 is a depiction of a selection of a user according to various embodiments.

FIG. 6 is a depiction of a selection of a user according to various embodiments. In some embodiments, a list of the profiles is sorted according to fitness value. To continue the SMS task 312 example, the table 602 includes a sorted list of the fitness metric 508 of User A 354 from neural network 500 as described in FIG. 5A, the fitness metric 536 of User B 356 from neural network 530 as described in FIG. 5B, the fitness metric 566 of User C 358 from neural network 560 as described in FIG. 5C, and the fitness metric 596 of User D 360 from neural network 590 as described in FIG. 5D.

In some embodiments, a portion 604 of the profiles may be pre-selected based on a threshold fitness metric, a percentile threshold, or the like. For example, the portion 604 is based on a percentile threshold which pre-selects the profiles having a fitness metric within a top 50% percentile of the fitness metrics.

The stochastic model 606, implemented by the stochastic module 210, may select a profile based on a Gaussian distribution, a lottery, or the like. In embodiments where the selection is based on a lottery, each profile is assigned a range of numbers according to a probability of being selected based on the fitness metric. A random number is generated. The profile assigned to range that includes the random number is selected for the task.

Returning to the above SMS task 312 example, User A 354 and User B 356 may be pre-selected because both are associated with a fitness metric in the top fiftieth percentile. By normalizing the fitness metrics of both profiles, the profile of User A 354 has a 71% chance of being selected and the profile of User B 356 has a 29% chance of being selected. Based on these probabilities, the profile of User A 354 is assigned a range of numbers from zero to 0.71 and the profile of User B 356 is assigned a range of numbers from 0.72 to 1.00. A random number is generated. If the random number is 0.89, the task is allocated to the profile of User B 356 even though User B 356 has a lower fitness metric than User A 354.

The output module 212 is configured to route the task to the user associated with the selected profile. The feedback module 214 is configured to collect feedback from at least two sources. The first source of feedback is based on the behavior of the user in performing the task. For example, data may be collected based on whether the user accepts the task, an elapsed amount of time for the selected user to accept the task, whether the user provided a solution to the task, an elapsed amount of time for the user to provide a solution to the task, a number of times that the user has completed a previous task, whether the selected user has accepted a task within a time-out period, whether the selected user has provided a solution to the task within a time-out period, or the like. The second source of feedback is the individual who initiated the task. This feedback includes accepting or rejecting the solution provided by the user.

The feedback module 212 is configured to update the profile of the user based on the feedback. For example, if the solution is accepted, the skill metrics associated with the task attributes may be increased or weights within the neural network may be modified as is discussed in connection with FIG. 7. The feedback based on the behavior of the user may be used to update weights within the neural network according to a learning function.

Figure 7:
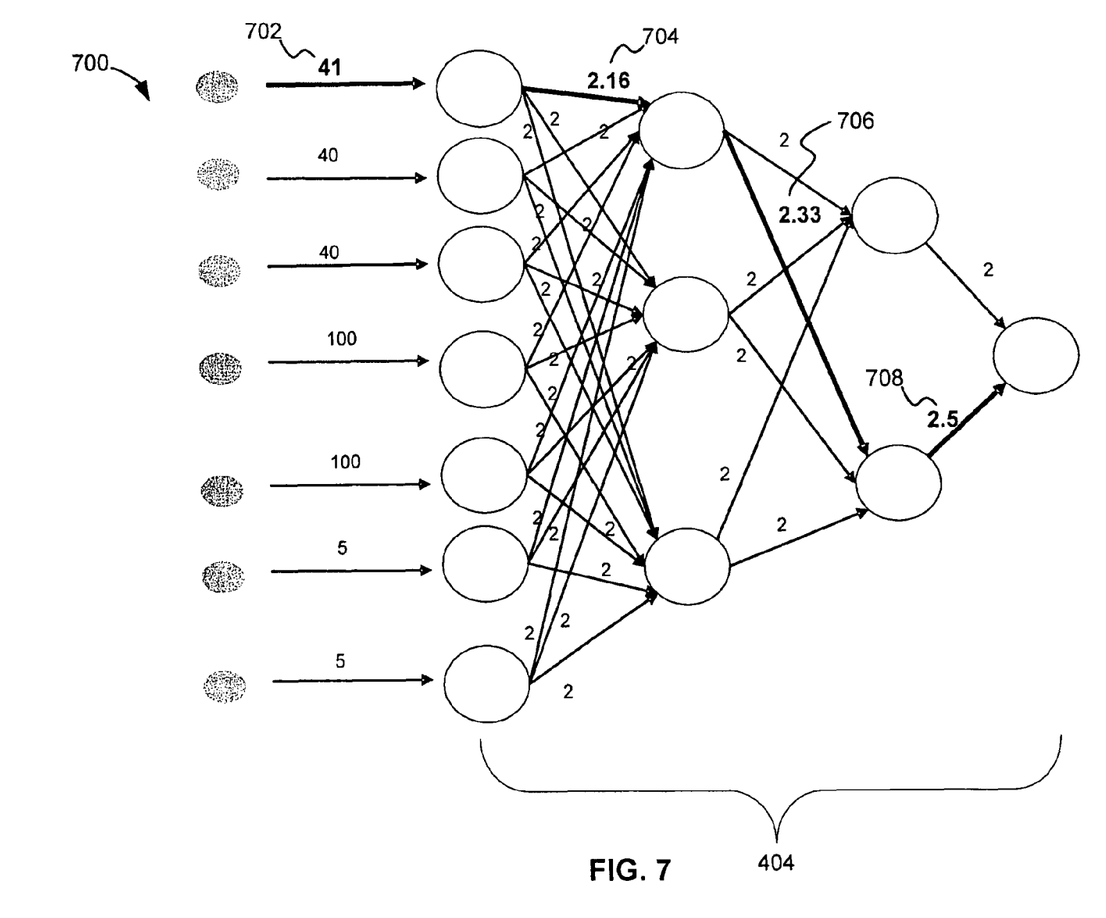
FIG. 7 is a depiction of an updated neural network associated with the second user according to various embodiments.

Referring to FIG. 7, an updated neural network 700 associated with the User B 356 according to various embodiments is depicted. To continue the SMS task 312 example, if the solution provided by User B 356 is accepted, the skill metric 702 associated with the SMS skill is increased from the value forty to the value forty-one. The skill metric may be modified by incrementing the previous skill level by a pre-defined amount for each solution provided by the user that is accepted. Other methods of updating the skill metric will be apparent to those skilled in the art.

The unsupervised portion 404 is updated by modifying the weights and/or the topology of the neural network 700 according to known methods. In one embodiment, the weights in the neural network 700 are generated according to a learning function such as:

$$w_{m(new)} = w_m + s/n$$

where $w_{m(new)}$ is the updated weight between the designated nodes, $w_m$ is the previous weight between the designated nodes, s is +1 if the solution was accepted and −1 if the solution was rejected, and n is the incoming connections on the node. Using this equation, new weights 704, 706, and 708 are calculated along one possible path through the neural network. In this example, because each possible path in the neural network 530 of FIG. 5B has equal weights, the selection of the weights that are modified is random. In some embodiments, only the most heavily weighted path is updated.

The routing system 104 as described in connection with FIGS. 1-7 therefore allows tasks to be allocated to users based on known information stored as skill metrics and behavioral information stored as performance indicators. As each user is allocated tasks and provides solutions to those tasks, the neural networks become more refined and are more able to accurately measure fitness values associated with each user. Further, the stochastic model allows for distribution of the tasks to users who may be able to provide a solution to the task but would not have been chosen by merely comparing fitness metrics calculated by the neural networks.

Figure 8:
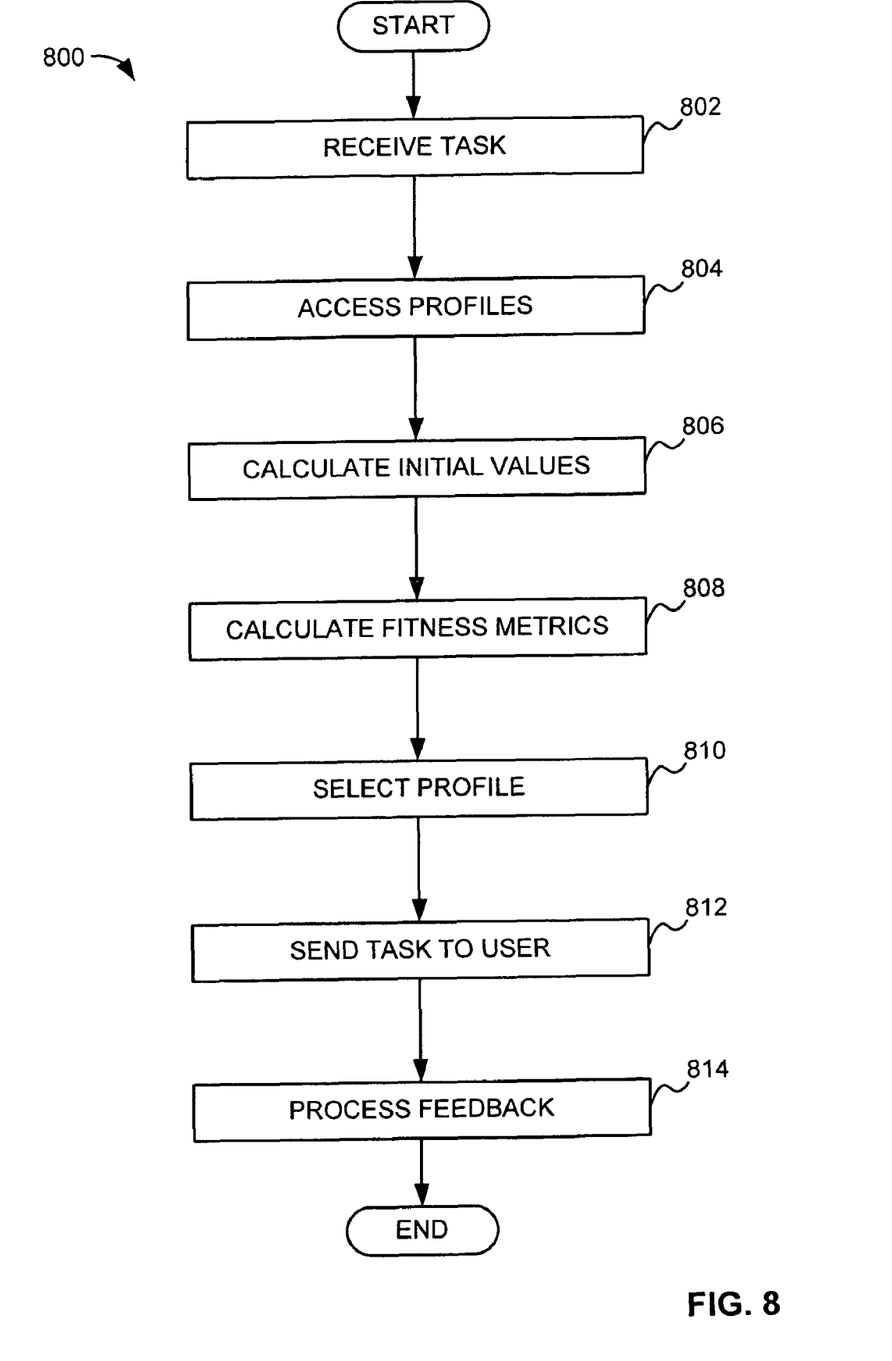
FIG. 8 is a flowchart of a method for allocating a task to a user according to various embodiments.

FIG. 8 is a flowchart of a method 800 for allocating a task to a user according to various embodiments. The method 800 may be performed by the routing system 104.

In step 802, a task is received. The task includes at least one normalized skill attribute. The step 802 may be performed by the input module 202.

In step 804, profiles are accessed. Each profile is associated with a user and includes skill metrics and performance indicators. The step 804 may be performed by the profile module 204.

Initial values for each profile are calculated in step 806. The initial values may be calculated by the supervised learning module 206.

A fitness metric for each profile is calculated in step 808. The step 808 may be performed by the unsupervised learning module 208.

In step 810, a profile is selected by, for example, the stochastic module 210.

In step 812, the task is routed to the user associated with the selected profile by, for example, the output module 212.

In an optional step 814, feedback is collected from the individual who initiated the task and/or based on the behavior of the user associated with the selected profile. The feedback may be collected by the feedback module 214.

Several embodiments are specifically illustrated and/or described herein. However, it will be appreciated that modification and variations are covered by the above teachings and within the scope of the appended claims without departing from the spirit and intended scope thereof. While the SMS task example 312 has been discussed in detail for the purposes of illustration, as will be apparent to those skilled in the art, other types of tasks may be allocated using the routing system 104.

The embodiments discussed herein are illustrative of the present invention. As these embodiments of the present invention are described with reference to illustrations, various modifications or adaptations of the methods or specific structures described may become apparent to those skilled in the art. All such modifications, adaptions, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A computer-implemented method comprising:
receiving at a computer system a task from a requester, the task including at least one normalized task attribute;
receiving at the computer system a plurality of profiles from users distributed across a communications network, each profile associated with one of the users and including a plurality of skill metrics and a plurality of performance indicators of the user;
calculating an initial value for each profile based on the at least one normalized task attribute and the plurality of skill metrics;
calculating a fitness metric for each profile based on the initial value using a neural network having weights based on the plurality of performance indicators;
selecting a portion of the plurality of profiles based on the fitness metric;
selecting one of the profiles from the portion of the plurality of profiles based on a stochastic model such that each of the profiles in the portion of the plurality of profiles has a probability of being selected;
routing the task from the computer system to the user associated with the selected profile; and
updating the plurality of performance indicators for the user associated with the selected profile based on one or more of:
the elapsed amount of time for the user to accept the routed task; and
the percentage of all tasks routed to the user, including the routed task and any tasks previously routed to the user, to which the user has provided a solution.

2. The method of claim 1, further comprising updating at least one of the plurality of skill metrics of the selected profile based on whether a solution to the task provided by the user was accepted by the requestor or by the system according to a set of rules of acceptance.

3. The method of claim 1, wherein at least one of the plurality of the skill metrics is based on a certification.

4. The method of claim 1, further comprising updating at least one of the plurality of performance indicators based on whether the user associated with the selected profile accepts the routed task.

5. The method of claim 1, further comprising updating at least one of the plurality of performance indicators based on whether the user associated with the selected profile provided a solution to the routed task.

6. The method of claim 1, further comprising updating at least one of the plurality of performance indicators based on an elapsed amount of time for the user associated with the selected profile to provide a solution to the routed task.

7. The method of claim 1, wherein the stochastic model is based on a lottery.

8. The method of claim 1, wherein the stochastic model is based on a Gaussian distribution.

9. A computer system comprising:
an input module configured to receive a task including at least one normalized task attribute;
a processor configured to:
receive a plurality of profiles from users distributed across a communications network, each profile associated with one of the users and including a plurality of skill metrics and a plurality of performance indicators of the user;
calculate an initial value for each profile based on the at least one normalized task attribute and the plurality of skill metrics;
calculate a fitness metric for each profile based on the initial value using a neural network having weights based on the plurality of performance indicators;
select a portion of the plurality of profiles based on the fitness metric;
select one of the profiles from the portion of the plurality of profiles based on a stochastic model such that each of the profiles in the portion of the plurality of profiles has a probability of being selected;
an output module configured to route the task to the user associated with the selected profile; and
wherein the processor is further configured to update the plurality of performance indicators for the user associated with the selected profile based on one or more of:
the elapsed amount of time for the user to accept the routed task; and
the percentage of all tasks routed to the user, including the routed task and any tasks previously routed to the user, to which the user has provided a solution.

10. The system of claim 9, wherein at least one of the plurality of the skill metrics is based on a certification.

11. The system of claim 9, wherein the processor is further configured to update the selected profile based on whether a solution to the task provided by the user was accepted by the system according to a set of rules of acceptance or by the requester.

12. The system of claim 11, wherein the processor is further configured to update at least one of the plurality of performance indicators based on whether the user associated with the selected profile accepts the routed task.

13. The system of claim 11, wherein the processor is further configured to update at least one of the plurality of performance indicators based on whether the user associated with the selected profile provided a solution to the routed task.

14. The system of claim 11, wherein the processor is further configured to update at least one of the plurality of performance indicators based on an elapsed amount of time for the user associated with the selected profile to provide a solution to the routed task.

15. The system of claim 9, wherein the stochastic model is based on a lottery.

16. The system of claim 9, wherein the stochastic model is based on a Gaussian distribution.

17. A non-transitory computer readable medium having embodied thereon a program executable by a processor for executing a method for allocating a task, the method comprising:
receiving at a computer system a task from a requester, the task including at least one normalized task attribute;
receiving at the computer system a plurality of profiles from users distributed across a communications network, each profile associated with one of the users and including a plurality of skill metrics and a plurality of performance indicators of the user;
calculating an initial value for each profile based on the at least one normalized task attribute and the plurality of skill metrics;
calculating a fitness metric for each profile based on the initial value using a neural network having weights based on the plurality of performance indicators;
selecting a portion of the plurality of profiles based on the fitness metric;
selecting one of the profiles from the portion of the plurality of profiles based on a stochastic model such that each of the profiles in the portion of the plurality of profiles has a probability of being selected;

routing the task from the computer system to the user associated with the selected profile; and updating the plurality of performance indicators for the user associated with the selected profile based on one or more of:

the elapsed amount of time for the user to accept the routed task; and the percentage of all tasks routed to the user, including the routed task and any tasks previously routed to the user, to which the user has provided a solution.

18. The computer readable medium of claim 17, wherein at least one of the plurality of the skill metrics is based on a certification.

* * * * *